US012519353B2

United States Patent
Saito et al.

(10) Patent No.: US 12,519,353 B2
(45) Date of Patent: Jan. 6, 2026

(54) ROTOR CORE WITH PLURALITY OF PERMANENT MAGNETS AND MAGNET HOLES WITH BRIDGES BETWEEN MAGNETS/MAGNET HOLES

(71) Applicants: AISIN CORPORATION, Aichi (JP); TOYOTA JIDOSHA KABUSHIKI KAISHA, Toyota (JP)

(72) Inventors: Naoto Saito, Kariya (JP); Ami Iijima, Kariya (JP); Teppei Tsuda, Kariya (JP); Toshinori Okochi, Toyota (JP)

(73) Assignees: AISIN CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 241 days.

(21) Appl. No.: 18/034,809

(22) PCT Filed: Dec. 21, 2021

(86) PCT No.: PCT/JP2021/047306
§ 371 (c)(1),
(2) Date: May 1, 2023

(87) PCT Pub. No.: WO2022/149458
PCT Pub. Date: Jul. 14, 2022

(65) Prior Publication Data
US 2023/0412018 A1      Dec. 21, 2023

(30) Foreign Application Priority Data

Jan. 8, 2021    (JP) .................... 2021-002282

(51) Int. Cl.
*H02K 1/27*        (2022.01)
*H02K 1/276*      (2022.01)
*H02K 29/03*      (2006.01)

(52) U.S. Cl.
CPC ............ *H02K 1/276* (2013.01); *H02K 29/03* (2013.01)

(58) Field of Classification Search
CPC ........ H02K 1/27; H02K 1/276; H02K 1/2766; H02K 1/2773; H02K 1/2706; H02K 1/246;
(Continued)

(56) References Cited

U.S. PATENT DOCUMENTS 2,913,607 A * 11/1959 Douglas ................. H02K 19/14
                                                          310/216.107
3,840,763 A * 10/1974 Baumann ................ H01F 7/021
                                                          310/156.56
(Continued)

FOREIGN PATENT DOCUMENTS

CN        104242509 A      12/2014
CN        209072186 U       7/2019
(Continued)

OTHER PUBLICATIONS

WO-2016115722-A1 Description English Translation.*
(Continued)

*Primary Examiner* — Maged M Almawri
(74) *Attorney, Agent, or Firm* — Oliff PLC

(57) ABSTRACT

A laminated core of this rotor core includes one side magnet hole provided on one side in a circumferential direction with respect to a d-axis, an other side magnet hole provided on the other side, an intermediate magnet hole, a first outer bridge portion, a second outer bridge portion, a first inner bridge portion, and a second inner bridge portion.

13 Claims, 2 Drawing Sheets

(58) Field of Classification Search
CPC .... H02K 1/2713; H02K 1/272; H02K 1/2726; H02K 1/2733; H02K 29/03; H02K 1/28; H02K 2213/03
USPC ................ 310/156.1–156.57, 156.01–156.84
See application file for complete search history.

(56) References Cited

U.S. PATENT DOCUMENTS

| | | | | |
|---|---|---|---|---|
| 4,327,302 | A * | 4/1982 | Hershberger | H02K 1/2766 310/156.56 |
| 4,922,152 | A | 5/1990 | Gleghorn et al. | |
| 5,117,553 | A * | 6/1992 | Kliman | H02K 1/2766 29/598 |
| 5,159,220 | A * | 10/1992 | Kliman | H02K 1/2766 310/43 |
| 5,990,593 | A * | 11/1999 | Narita | H02K 1/246 310/216.069 |
| 6,087,751 | A | 7/2000 | Sakai | |
| 6,087,752 | A * | 7/2000 | Kim | H02K 1/2766 310/156.56 |
| 6,121,706 | A * | 9/2000 | Nashiki | H02K 1/246 310/216.106 |
| 6,177,745 | B1 * | 1/2001 | Narita | H02K 1/2766 310/156.43 |
| 6,218,753 | B1 * | 4/2001 | Asano | H02K 1/276 310/156.53 |
| 6,225,724 | B1 * | 5/2001 | Toide | H02K 1/2766 310/156.56 |
| 6,323,572 | B1 * | 11/2001 | Kinoshita | H02K 1/2791 310/156.55 |
| 6,329,734 | B1 * | 12/2001 | Takahashi | H02K 1/32 310/156.56 |
| 6,340,857 | B2 * | 1/2002 | Nishiyama | H02K 7/006 310/156.41 |
| 6,429,566 | B1 * | 8/2002 | Kuwahara | H02K 1/2773 310/156.56 |
| 6,794,784 | B2 * | 9/2004 | Takahashi | H02K 1/246 310/156.56 |
| 6,844,652 | B1 * | 1/2005 | Chu | H02K 21/46 310/216.097 |
| 6,847,143 | B1 * | 1/2005 | Akemakou | H02K 1/276 310/156.43 |
| 6,906,444 | B2 * | 6/2005 | Hattori | H02K 1/2766 310/156.31 |
| 7,288,868 | B2 * | 10/2007 | Tamaki | H02K 21/16 310/156.53 |
| 7,321,177 | B2 * | 1/2008 | Uchida | H02K 1/2766 310/156.53 |
| 7,436,095 | B2 * | 10/2008 | Aydin | H02K 1/278 310/156.53 |
| 7,732,965 | B2 * | 6/2010 | Nakayama | H02K 1/2766 310/156.56 |
| 7,868,501 | B2 * | 1/2011 | Jonasson | H02K 1/2766 310/156.56 |
| 7,952,249 | B2 * | 5/2011 | Kori | B60L 3/0061 310/156.53 |
| 8,089,190 | B2 * | 1/2012 | Lee | H02K 1/276 310/156.53 |
| 8,174,158 | B2 * | 5/2012 | Rahman | H02K 1/2766 310/156.56 |
| 8,198,774 | B2 * | 6/2012 | Takashima | H02K 1/276 310/156.43 |
| 8,350,430 | B2 * | 1/2013 | Komuro | H02K 1/02 310/156.01 |
| 8,350,434 | B2 * | 1/2013 | Hori | H02K 1/32 310/216.069 |
| 8,525,381 | B2 * | 9/2013 | Yabe | H02K 1/2766 310/156.53 |
| 8,749,103 | B2 * | 6/2014 | Bradfield | H02K 9/223 310/156.56 |
| 8,749,109 | B2 * | 6/2014 | Lendenmann | H02K 1/246 310/216.106 |
| 8,760,025 | B2 * | 6/2014 | Rahman | H02K 1/2766 310/156.53 |
| 8,766,503 | B2 * | 7/2014 | Kagami | H02K 1/2766 310/216.096 |
| 8,803,394 | B2 * | 8/2014 | Sano | H02K 1/2766 310/216.106 |
| 8,860,275 | B2 * | 10/2014 | Kaiser | H02K 1/2766 310/156.56 |
| 9,041,261 | B2 * | 5/2015 | Yamamoto | H02K 1/32 310/58 |
| 9,041,268 | B2 * | 5/2015 | Tomohara | H02K 1/278 310/156.53 |
| 9,083,219 | B2 * | 7/2015 | Choi | H02K 1/2773 |
| 9,225,209 | B2 * | 12/2015 | Li | H02K 1/276 |
| 9,893,581 | B2 * | 2/2018 | Kikuchi | B60L 50/61 |
| 10,153,672 | B2 * | 12/2018 | Saito | B60L 15/007 |
| 10,277,083 | B2 * | 4/2019 | Ronchetto | H02K 1/22 |
| 10,432,049 | B2 * | 10/2019 | Saint-Michel | H02K 1/2766 |
| 10,516,307 | B2 * | 12/2019 | Gieras | H02K 1/2706 |
| 10,622,853 | B2 * | 4/2020 | Toda | H02K 23/405 |
| 10,715,017 | B2 * | 7/2020 | Gieras | H02K 1/2746 |
| 11,139,704 | B2 * | 10/2021 | Sakamoto | H02K 1/24 |
| 11,251,665 | B2 * | 2/2022 | Hu | H02K 3/487 |
| 11,689,071 | B2 * | 6/2023 | Hu | B60K 1/00 310/156.56 |
| 12,095,311 | B2 * | 9/2024 | Hu | H02K 29/03 |
| 2001/0017499 | A1 * | 8/2001 | Kaneko | H02K 1/2766 310/156.28 |
| 2002/0036436 | A1 * | 3/2002 | Koharagi | H02K 1/2766 310/156.56 |
| 2002/0047409 | A1 * | 4/2002 | Hiroyuki | H02K 15/03 310/100 |
| 2004/0232779 | A1 * | 11/2004 | Arimitsu | H02K 1/18 310/43 |
| 2004/0256940 | A1 * | 12/2004 | Tsuruta | H02K 1/276 310/216.069 |
| 2005/0023923 | A1 | 2/2005 | Chu et al. | |
| 2005/0200223 | A1 * | 9/2005 | Tajima | H02K 1/2766 310/156.55 |
| 2006/0055267 | A1 * | 3/2006 | Arimitsu | H02K 1/2766 310/156.56 |
| 2007/0052313 | A1 * | 3/2007 | Takahashi | H02K 1/2766 310/156.53 |
| 2007/0103024 | A1 * | 5/2007 | Nakayama | H02K 1/2766 310/156.56 |
| 2007/0108169 | A1 * | 5/2007 | Shimada | H02K 15/03 310/156.53 |
| 2007/0108853 | A1 * | 5/2007 | Shah | H02K 1/246 310/216.054 |
| 2007/0145850 | A1 * | 6/2007 | Hsu | H02K 1/2766 310/191 |
| 2007/0152527 | A1 * | 7/2007 | Yura | H02K 1/246 310/156.53 |
| 2007/0284960 | A1 * | 12/2007 | Fulton | H02K 1/278 310/156.01 |
| 2009/0045688 | A1 * | 2/2009 | Liang | H02K 1/2766 310/156.53 |
| 2010/0019597 | A1 * | 1/2010 | Kolehmainen | H02K 1/2766 310/156.56 |
| 2010/0079026 | A1 * | 4/2010 | Han | H02K 1/2766 310/156.53 |
| 2010/0133941 | A1 * | 6/2010 | Feng | H02K 1/223 310/156.83 |
| 2010/0213780 | A1 * | 8/2010 | Lee | H02K 1/2766 310/156.53 |
| 2010/0301697 | A1 * | 12/2010 | Takahashi | H02K 1/2766 310/156.53 |
| 2011/0068652 | A1 * | 3/2011 | Qin | H02K 3/28 310/198 |
| 2011/0121668 | A1 * | 5/2011 | Condamin | H02K 1/2773 310/156.43 |
| 2011/0163624 | A1 * | 7/2011 | Hori | H02K 1/2766 310/156.53 |
| 2011/0285241 | A1 * | 11/2011 | Chamberlin | H02K 1/2766 310/216.016 |

(56) References Cited

U.S. PATENT DOCUMENTS

| | | | | |
|---|---|---|---|---|
| 2012/0032539 A1* | 2/2012 | Hori | ...................... | H02K 1/2766 310/156.53 |
| 2012/0242182 A1* | 9/2012 | Yabe | ...................... | H02K 1/276 310/156.53 |
| 2012/0267977 A1* | 10/2012 | Merwerth | ............ | H02K 1/2766 310/156.53 |
| 2013/0057103 A1* | 3/2013 | Han | ...................... | H02K 1/2773 310/156.12 |
| 2013/0113328 A1* | 5/2013 | Kogure | .................. | H02K 1/274 310/156.53 |
| 2013/0119811 A1* | 5/2013 | Kobayashi | ........... | H02K 1/2773 310/156.53 |
| 2013/0127283 A1* | 5/2013 | Matsumoto | .......... | H02K 1/2713 29/598 |
| 2013/0249342 A1* | 9/2013 | Funk | .................... | H02K 1/2766 310/156.53 |
| 2013/0320797 A1* | 12/2013 | Vyas | .................... | H02K 1/2766 310/156.43 |
| 2013/0342043 A1* | 12/2013 | Liang | ....................... | H02K 1/27 310/51 |
| 2014/0042834 A1* | 2/2014 | Asahi | ..................... | H02K 1/276 310/43 |
| 2014/0167550 A1* | 6/2014 | Huang | ................. | H02K 1/2766 310/156.19 |
| 2014/0225469 A1* | 8/2014 | Yoshikawa | ............ | H02K 15/03 310/156.53 |
| 2014/0346911 A1* | 11/2014 | Tsuchida | ................ | H02K 1/246 310/156.53 |
| 2015/0001981 A1* | 1/2015 | Hattori | ................. | H02K 1/2766 310/156.53 |
| 2015/0015093 A1* | 1/2015 | Gontermann | .......... | H02K 1/246 310/46 |
| 2015/0022042 A1* | 1/2015 | Han | ..................... | H02K 1/2773 310/156.23 |
| 2015/0115758 A1* | 4/2015 | Koka | ..................... | H02K 21/14 318/139 |
| 2015/0139830 A1* | 5/2015 | Nigo | ...................... | H02K 1/146 310/216.097 |
| 2015/0171684 A1* | 6/2015 | McClelland | ......... | H02K 1/2766 310/156.07 |
| 2015/0194850 A1* | 7/2015 | Muniz | .................. | H02K 1/2766 290/55 |
| 2015/0303749 A1* | 10/2015 | Okubo | ................... | H02K 21/14 310/156.38 |
| 2016/0172912 A1* | 6/2016 | Nigo | ..................... | F25B 31/026 417/415 |
| 2016/0190879 A1* | 6/2016 | Zheng | .................... | H02K 1/276 310/156.53 |
| 2016/0285327 A1* | 9/2016 | Sasaki | ..................... | H02K 1/246 |
| 2016/0301271 A1* | 10/2016 | Saito | ..................... | H02K 1/246 |
| 2016/0308428 A1* | 10/2016 | Xiao | ..................... | H02K 1/2706 |
| 2016/0336823 A1* | 11/2016 | Kikuchi | ................. | H02K 1/246 |
| 2017/0310171 A1* | 10/2017 | Reddy | .................... | H02K 1/146 |
| 2017/0317540 A1* | 11/2017 | Laldin | .................. | H02K 1/2766 |
| 2019/0089216 A1 | 3/2019 | Sano et al. | | |
| 2019/0109527 A1* | 4/2019 | Takahashi | .............. | H02K 19/10 |
| 2021/0344241 A1 | 11/2021 | Mitsuda et al. | | |
| 2022/0131433 A1* | 4/2022 | Hirano | ................. | H02K 1/2766 |
| 2023/0198322 A1* | 6/2023 | Tremelling | .......... | H02K 19/103 310/46 |

FOREIGN PATENT DOCUMENTS

| | | |
|---|---|---|
| GB | 2559015 A | 7/2018 |
| JP | H11-136890 A | 5/1999 |
| JP | 2004-357489 A | 12/2004 |
| JP | 2005-051979 A | 2/2005 |
| JP | 2007-274798 A | 10/2007 |
| JP | 2011-223742 A | 11/2011 |
| JP | 2011-223836 A | 11/2011 |
| JP | 2014-103741 A | 6/2014 |
| JP | 2016-082733 A | 5/2016 |
| JP | 2018-129938 A | 8/2018 |
| JP | 2019-054659 A | 4/2019 |
| WO | WO-2016115722 A1 * | 7/2016 |
| WO | 2020/090152 A1 | 5/2020 |

OTHER PUBLICATIONS

Feb. 8, 2022 Search Report issued in International Patent Application No. PCT/JP2021/047306.

Mar. 15, 2024 Extended European Search Report Issued in European Patent Application No. 21917678.1.

* cited by examiner

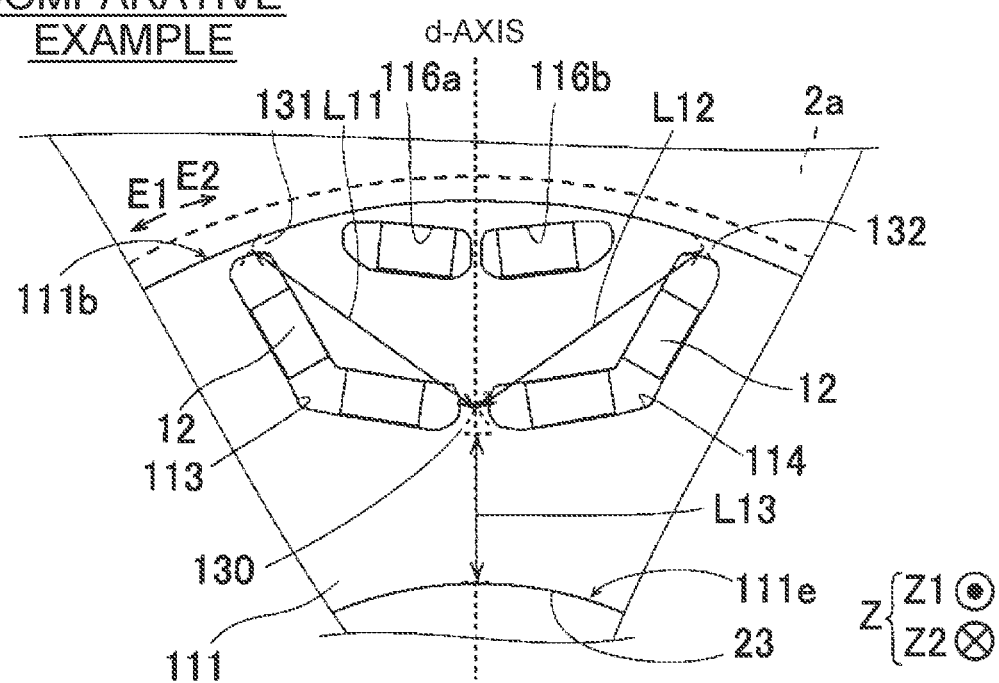

ROTOR CORE WITH PLURALITY OF PERMANENT MAGNETS AND MAGNET HOLES WITH BRIDGES BETWEEN MAGNETS/MAGNET HOLES

TECHNICAL FIELD

The present disclosure relates to rotor cores.

BACKGROUND ART

Conventionally, a rotor core is known that includes a laminated core into which permanent magnets are inserted. Such a rotor core is disclosed in, for example, Japanese Unexamined Patent Application Publication No. 2019-54659 (JP 2019-54659 A).

The rotor disclosed in JP 2019-54659 A includes a rotor core and a plurality of permanent magnets arranged in a two-layer arrangement structure in the rotor core. The two-layer arrangement structure is composed of a first layer on the outer peripheral side and a second layer on the inner peripheral side. Each of the first layer and the second layer is provided with two magnet holes into which the permanent magnets are inserted. The two magnet holes in the second layer are provided on one side in the circumferential direction and the other side in the circumferential side with respect to a d-axis. An inner bridge portion connecting a radially inner portion and a radially outer portion of the rotor core is provided between the two magnet holes in the second layer. This inner bridge portion is located on the d-axis. In the second layer, the two magnet holes are arranged in a convex shape (V-shape) pointing radially inward. Outer bridge portions are provided between the radially outer ends of the two magnet holes in the second layer and the outer edge of the rotor core. That is, the outer bridge portions are located on the one side in the circumferential direction and the other side in the circumferential direction with respect to the d-axis. A portion of the laminated core that is located between each outer bridge portion and the inner bridge portion is supported by the outer bridge portion and the inner bridge portion.

RELATED ART DOCUMENTS

Patent Documents

Patent Document 1: Japanese Unexamined Patent Application Publication No. 2019-54659 (JP 2019-54659 A)

SUMMARY OF THE INVENTION

Problem to be Solved by the Invention

In the rotor disclosed in JP 2019-54659 A, however, the inner bridge portion is located on the d-axis. Therefore, the distances between the outer bridge portions provided on the one side in the circumferential direction and the other side in the circumferential direction with respect to the d-axis and the inner bridge portion located on the d-axis are relatively large. Since the distance between each outer bridge portion and the inner bridge portion is relatively large, the portion of the laminated core that is located between each outer bridge portion and the inner bridge portion tends to be deformed due to the centrifugal force generated when the rotor is rotated, and the stress that is applied to each outer bridge portion due to the deformation of the laminated core is relatively large.

Moreover, since the two magnet holes in the second layer are arranged in a convex shape pointing radially inward, the portion of the laminated core that is located radially outward of the second layer (inner bridge) is relatively large in amount. In this case, the stress that is applied to the inner bridge portion due to the centrifugal force generated when the rotor is rotated is relatively large.

For these reasons, a rotor core is desired that can reduce the stress that is applied to an inner bridge portion (radially inner bridge portion) and an outer bridge portion (radially outer bridge portion).

The present disclosure was made to solve the above problems, and it is one object of the present disclosure to provide a rotor core that can reduce the stress that is applied to a radially inner bridge portion and a radially outer bridge portion.

Means for Solving the Problem

In order to achieve the above object, a rotor core according to one aspect of the present disclosure includes: an annular laminated core formed by stacking a plurality of electrical steel sheets; and a plurality of permanent magnets forming a plurality of magnetic poles arranged circumferentially. The laminated core includes, in each of the plurality of magnetic poles, a one side magnet hole that is provided on one side in a circumferential direction with respect to a d-axis and into which the permanent magnet is inserted, an other side magnet hole that is provided on the other side in the circumferential direction with respect to the d-axis and into which the permanent magnet is inserted, an intermediate magnet hole that is provided between the one side magnet hole and the other side magnet hole and into which a plurality of the permanent magnets is inserted so as to be arranged in a convex shape pointing radially outward, a first outer bridge portion provided between a radially outer end of the one side magnet hole and an outer edge of the laminated core, a second outer bridge portion provided between a radially outer end of the other side magnet hole and the outer edge, a first inner bridge portion provided between the one side magnet hole and the intermediate magnet hole and connecting a radially inner portion of the laminated core and a radially outer portion of the laminated core, and a second inner bridge portion provided between the other side magnet hole and the intermediate magnet hole and connecting the radially inner portion and the radially outer portion.

In the rotor core according to the aspect of the present disclosure, as described above, the laminated core includes the first inner bridge portion provided between the one side magnet hole and the intermediate magnet hole, and the second inner bridge portion provided between the other side magnet hole and the intermediate magnet hole. Since the first inner bridge portion is thus located on the one side in the circumferential direction with respect to the d-axis, the distance between the first outer bridge portion and the first inner bridge portion can be reduced compared to the case where the first inner bridge portion is located on the d-axis. Moreover, since the second inner bridge portion is located on the other side in the circumferential direction with respect to the d-axis, the distance between the second outer bridge portion and the second inner bridge portion can be reduced compared to the case where the second inner bridge portion is located on the d-axis. The radially outer portion of the laminated core can thus be supported by the bridge portions located relatively close to each other. As a result, the radially outer portion of the laminated core between the first outer bridge portion (second outer bridge portion) and the first inner bridge portion (second inner bridge portion) can be prevented from being deformed due to a centrifugal force that is generated when a rotor is rotated. Stress that is applied to each of the first outer bridge portion and the second outer bridge portion can be thus reduced. As described above, the laminated core includes the intermediate magnet hole into which the plurality of permanent magnets is inserted so as to be arranged in a convex shape pointing radially outward. Accordingly, as compared to the case where the intermediate magnet hole is provided into which the plurality of permanent magnets is inserted so as to be arranged in a convex shape pointing radially inward, the radially outer portion of the laminated core that is provided radially outward of the intermediate magnet hole can be relatively reduced in amount. As a result, it is possible to reduce stress (radially outward tensile stress) that is applied to the first inner bridge portion and the second inner bridge portion due to the centrifugal force that is generated when the rotor is rotated. As a result, it is possible to reduce the stress that is applied to each of the radially inner bridge portions (first inner bridge portion and second inner bridge portion) and the radially outer bridge portions (first outer bridge portion and second outer bridge portion).

The radially outer portion of the laminated core is supported from the radially inner side by the two bridge portions, namely the first inner bridge portion and the second inner bridge portion. Therefore, the radially outer portion of the laminated core can be supported more stably and firmly compared to the case where the radially outer portion is supported from the radially inner side by a single bridge portion.

Effects of the Invention

According to the present disclosure, it is possible to reduce the stress that is applied to the radially inner bridge portions and the radially outer bridge portions.

BRIEF DESCRIPTION OF THE DRAWINGS

FIG. 3 is a partial enlarged plan view of one magnetic pole of a rotor core according to a comparative example.

MODES FOR CARRYING OUT THE INVENTION

Figure 1:
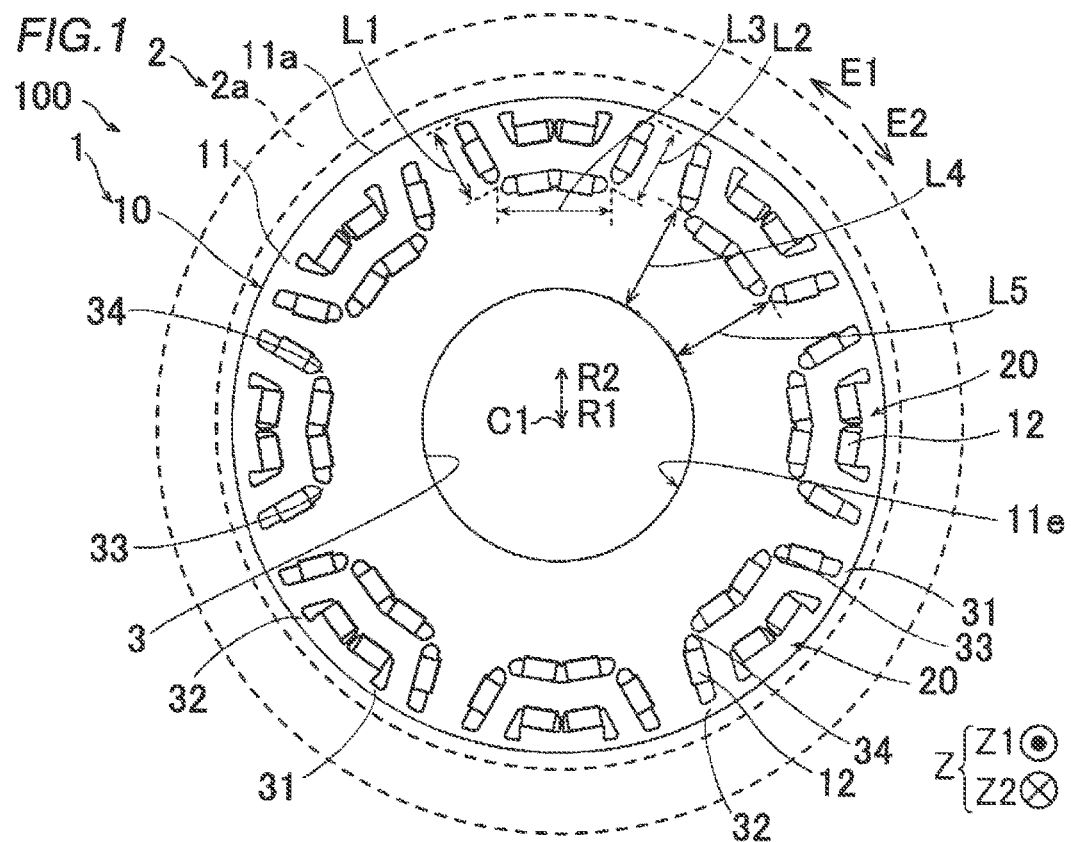
FIG. 1 is a plan view showing the configuration of a rotating electrical machine according to an embodiment.

Hereinafter, an embodiment of the present disclosure will be described with reference to the drawings.

A rotor core 10 according to the embodiment will be described with reference to FIGS. 1 and 2.

In the following description, the "axial direction" means the direction along a rotation axis C1 of the rotor core 10 (laminated core 11) and means the Z direction in the drawings. The "radial direction" means the radial direction of the rotor core 10 (R1 direction or R2 direction), and the "circumferential direction" means the circumferential direction of the rotor core 10 (E1 direction or E2 direction).

(Structure of Rotor Core)

First, the structure of the rotor core 10 of the present embodiment will be described with reference to FIGS. 1 and 2.

As shown in FIG. 1, a rotating electrical machine 100 includes a rotor 1 and a stator 2. The rotor 1 and the stator 2 are each formed in an annular shape. The rotor 1 is disposed radially inward of the stator 2 so as to face the stator 2. That is, in the present embodiment, the rotating electrical machine 100 is configured as an inner rotor type rotating electrical machine.

The rotor 1 includes the rotor core 10 and a shaft, not shown. The rotor core 10 has a shaft insertion hole 3 into which the shaft, not shown, is inserted. The shaft is connected to an engine, an axle, etc. via a rotational force transmission member such as a gear. For example, the rotating electrical machine 100 is configured as a motor, a generator, or a motor generator, and is configured to be mounted on a vehicle.

The rotor core 10 includes the laminated core 11 having an annular shape. The laminated core 11 is formed by stacking a plurality of electrical steel plates 11a in the axial direction (Z direction). The rotor core 10 further includes a plurality of permanent magnets 12. The rotating electrical machine 100 is configured as an interior permanent magnet motor (IPM motor).

A plurality of permanent magnets 12 forms a plurality of magnetic poles 20. Each of the plurality of magnetic poles 20 is formed by six permanent magnets 12 shown in FIG. 2. As shown in FIG. 1, in the rotor core 10, eight magnetic poles 20 are arranged circumferentially. The detailed configuration of the magnetic pole 20 will be described later.

The stator 2 includes a stator core 2a and a coil, not shown, disposed in the stator core 2a. The stator core 2a is composed of, for example, a plurality of electrical steel sheets (silicon steel sheets) stacked on top of each other in the axial direction, and is configured to allow magnetic flux to pass therethrough. The coil is connected to an external power supply unit, and is configured to be supplied with electric power (e.g. three-phase alternating current electric power). The coil is configured to generate a magnetic field when supplied with electric power. The rotor 1 and the shaft, not shown, are configured to rotate with respect to the stator 2 as the engine etc. is driven or the axle is rotated, even when no electric power is supplied to the coil.

The permanent magnets 12 are rectangular in cross section orthogonal to the axial direction of the rotor core 10 (Z direction). The permanent magnets 12 are, for example, neodymium magnets.

Magnet holes (13, 14, 15, 16), which will be described later, of the laminated core 11 into which the permanent magnets 12 are inserted are filled with a thermosetting resin material, not shown. The resin material is provided so as to fix the permanent magnets 12 disposed in the magnet holes (13, 14, 15, 16).

(Configuration of Magnetic Pole)

The configuration of each magnetic pole 20 will be described with reference to FIG. 2.

Figure 2:
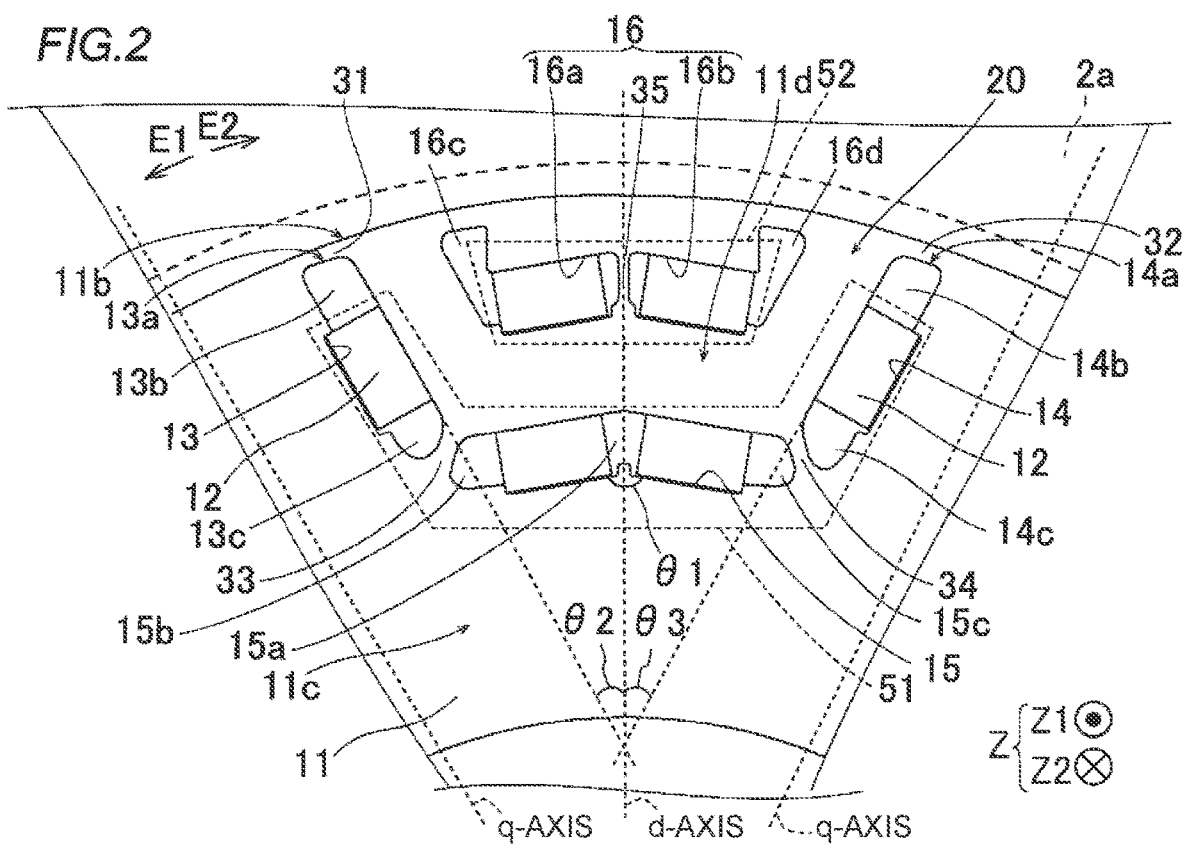
FIG. 2 is a partial enlarged plan view of one magnetic pole of a rotor core according to the embodiment.

As shown in FIG. 2, the laminated core 11 includes a magnet hole 13, a magnet hole 14, a magnet hole 15, and a magnet hole 16. The magnet hole 13, the magnet hole 14, the magnet hole 15, and the magnet hole 16 are provided in each of the plurality of magnetic poles 20. The magnet hole 13 and the magnet hole 14 are examples of the "one side magnet hole" and the "other side magnet hole" in the claims, respectively. The magnet hole 15 and the magnet hole 16 are examples of the "intermediate magnet hole" and the "outer magnet hole" in the claims, respectively.

The magnet hole 13 is provided on one side (E1 side) in the circumferential direction with respect to a d-axis. The magnet hole 14 is provided on the other side (E2 side) in the circumferential direction with respect to the d-axis.

The magnet hole 15 is provided between the magnet hole 13 and the magnet hole 14. A plurality of (two in the present embodiment) permanent magnets 12 is inserted into the magnet hole 15.

In the present embodiment, the plurality of permanent magnets 12 inserted into the magnet hole 15 is arranged in a convex shape pointing radially outward. In other words, the plurality of permanent magnets 12 inserted into the magnet hole 15 is arranged in a V-shape pointing radially outward.

Accordingly, as compared to the case where the magnet hole 15 is provided into which the plurality of permanent magnets 12 is inserted so as to be arranged in a convex shape pointing radially inward, a radially outer portion 11d of the laminated core 11 that is provided radially outward of the magnet hole 15 can be relatively reduced in amount. As a result, it is possible to reduce the stress (radially outward tensile stress) that is applied to a bridge portion 33 described later and a bridge portion 34 described later due to the centrifugal force that is generated when the rotor 1 is rotated.

In the present embodiment, the magnet hole 15 is formed by a single hole that is bent into a convex shape pointing radially outward and into which the plurality of permanent magnets 12 is inserted. That is, the magnet hole 15 has a V-shape pointing radially outward. The magnet hole 15 is provided so as to extend across the d-axis. The bend angle θ1 of the magnet hole 15 is an angle larger than 90 degrees.

A single hole bent into a convex shape pointing radially outward is thus provided, the plurality of permanent magnets 12 that is inserted into the magnet hole 15 can be easily arranged in a convex shape pointing radially outward. Since the magnet hole 15 is formed by a single hole, no magnetic path formed between holes is provided in the magnet hole 15 unlike the case where the magnet hole 15 is formed by a plurality of holes. As a result, the magnetic flux flowing radially outward of the magnet hole 15 can be prevented from flowing (leaking) into the radially inner side of the laminated core 11.

The permanent magnets 12 are inserted into one side (E1 side) and the other side (E2 side) in the circumferential direction of the magnet hole 15 with respect to the d-axis. Specifically, the two permanent magnets 12 inserted into the magnet hole 15 are arranged symmetrically with respect to the d-axis.

This can improve the rotational balance of the rotor 1 compared to the case where the permanent magnet 12 is disposed in only one side of the magnet hole 15 with respect to the d-axis.

In the present embodiment, a flux barrier 15a is formed between the permanent magnets 12 inserted into the magnet hole 15. No bridge portion connecting a radially inner portion 11c of the laminated core 11 and the radially outer portion 11d of the laminated core 11 is provided between the permanent magnets 12 inserted into the magnet hole 15. The flux barrier 15a is provided on the d-axis. The flux barrier 15a is an example of the "magnetic gap" in the claims.

The flux barrier 15a can thus prevent the magnetic flux flowing radially outward of the magnet hole 15 from flowing (leaking) into the radially inner side of the laminated core 11 through between the permanent magnets 12 inserted into the magnet hole 15. As a result, a reduction in reluctance torque can be prevented.

The magnet hole 15 includes a flux barrier 15b and a flux barrier 15c. The flux barrier 15b is provided on the E1 side of the permanent magnet 12 disposed in the E1 side out of the two permanent magnets 12 inserted into the magnet hole 15. The flux barrier 15c is provided on the E2 side of the permanent magnet 12 disposed in the E2 side out of the two permanent magnets 12 inserted into the magnet hole 15.

An inner magnet layer 51 is formed by the permanent magnet 12 inserted into the magnet hole 13, the permanent magnet 12 inserted into the magnet hole 14, and the two permanent magnets 12 inserted into the magnet hole 15.

The laminated core 11 includes a bridge portion 31 and a bridge portion 32. The bridge portion 31 and the bridge portion 32 are provided in each of the plurality of magnetic poles 20. The bridge portion 31 is provided between a radially outer end 13a of the magnet hole 13 and an outer edge 11b of the laminated core 11. The bridge portion 32 is provided between a radially outer end 14a of the magnet hole 14 and the outer edge 11b of the laminated core 11. The bridge portion 31 and the bridge portion 32 are examples of the "first outer bridge portion" and the "second outer bridge portion," respectively.

In the present embodiment, the laminated core 11 includes, in each of the plurality of magnetic poles 20, a bridge portion 33 provided between the magnet hole 13 and the magnet hole 15 and a bridge portion 34 provided between the magnet hole 14 and the magnet hole 15. Specifically, the bridge portion 33 is provided on the one side (E1 side) in the circumferential direction with respect to the d-axis. The bridge portion 34 is provided on the other side (E2 side) in the circumferential direction with respect to the d-axis. Each of the bridge portion 33 and the bridge portion 34 is provided so as to connect the radially inner portion 11c of the laminated core 11 and the radially outer portion 11d of the laminated core 11. The bridge portion 33 and the bridge portion 34 are examples of the "first inner bridge portion" and the "second inner bridge portion," respectively.

Since the bridge portion 33 is thus located on the one side in the circumferential direction with respect to the d-axis, the distance L1 between the bridge portion 31 and the bridge portion 33 (see FIG. 1) can be reduced compared to the case where the bridge portion 33 is located on the d-axis. Since the bridge portion 34 is located on the other side in the circumferential direction with respect to the d-axis, the distance L2 between the bridge portion 32 and the bridge portion 34 (see FIG. 1) can be reduced compared to the case where the bridge portion 34 is located on the d-axis. The radially outer portion 11d of the laminated core 11 can thus be supported by the bridge portions located relatively close to each other. As a result, the radially outer portion 11d of the laminated core 11 between the bridge portion 31 (bridge portion 32) and the bridge portion 33 (bridge portion 34) can be prevented from being deformed due to the centrifugal force that is generated when the rotor 1 is rotated. The stress that is applied to each of the bridge portion 31 and the bridge portion 32 can be thus reduced.

Moreover, since the laminated core 11 (permanent magnets 12) is supported from the radially inner side by the two bridge portions, namely the bridge portion 33 and the bridge portion 34, the laminated core 11 (permanent magnets 12) can be more stably and firmly supported compared to the case where the laminated core 11 (permanent magnets 12) is supported from the radially inner side by a single bridge portion.

The bridge portion 33 and the bridge portion 34 are arranged symmetrically with respect to the d-axis. This can further improve the rotational balance of the rotor 1 compared to the case where the bridge portion 33 and the bridge portion 34 are arranged asymmetrically with respect to the d-axis.

In each of the plurality of magnetic poles 20, the magnet hole 15 is configured to be symmetrical with respect to the d-axis, and the magnet hole 13 and the magnet hole 14 are provided symmetrically with respect to the d-axis. That is, the entire magnetic pole 20 is configured to be symmetrical with respect to the d-axis.

In the present embodiment, each of the bridge portion 33 and the bridge portion 34 is tilted toward the d-axis such that the radial outer sides of the bridge portion 33 and the bridge portion 34 are located closer to the d-axis as viewed in the axial direction (Z1 direction) of the laminated core 11. That is, each of the bridge portion 33 and the bridge portion 34 is provided such that the extension line of each of the bridge portion 33 and the bridge portion 34 crosses the d-axis at a position radially outward of the magnet hole 15.

When the rotor core 10 is rotated, a centrifugal force is applied to each part of the laminated core 11 in the radially outward direction toward the d-axis. Therefore, since the bridge portion 33 (bridge portion 34) is tilted toward the d-axis such that the radial outer side of the bridge portion 33 (bridge portion 34) is located closer to the d-axis as viewed in the axial direction, the stress (tensile stress) due to the centrifugal force generated when the rotor 1 is rotated is applied to the bridge portion 33 (bridge portion 34) in the direction in which the bridge portion 33 (bridge portion 34) extends. As a result, stress in a bending direction (or twisting direction) can be prevented as much as possible from being applied to each of the bridge portion 33 and the bridge portion 34.

Each of the magnet hole 13 and the magnet hole 14 is provided so as to extend in the radial direction. That is, the permanent magnets 12 inserted into each of the magnet hole 13 and the magnet hole 14 are provided so as to extend in the radial direction.

In the present embodiment, the laminated core 11 is configured so that the permanent magnet 12 inserted into the magnet hole 13, the permanent magnet 12 inserted into the magnet hole 14, and the plurality of permanent magnets 12 inserted into the magnet hole 15 are arranged in a W-shape.

Since the radially outer end 13a of the magnet hole 13 and the radially outer end 14a of the magnet hole 14 can thus be easily located close to the outer edge 11b of the laminated core 11, the radial widths of the bridge portion 31 and the bridge portion 32 can be easily reduced. As a result, the reluctance torque can be prevented from being reduced due to the magnetic flux along the magnet hole 13 (magnet hole 14) flowing in the circumferential direction through the bridge portion 31 and the bridge portion 32 (leaking toward the adjacent magnetic poles 20). Since the plurality of permanent magnets 12 is thus arranged in a W-shape (permanent magnets 12 in the magnet hole 15 are arranged in a convex shape pointing radially outward) while preventing a reduction in reluctance torque, stress that is applied to each of the radially inner bridge portions (bridge portion 33 and bridge portion 34) and the radially outer bridge portions (bridge portion 31 and bridge portion 32) can be reduced.

Each of the angle θ2 between the direction in which the magnet hole 13 extends and the d-axis and the angle θ3 between the direction in which the magnet hole 14 extends and the d-axis is smaller than ½ of the bend angle θ1 of the magnet hole 15. The angle θ2 and the angle θ3 are substantially equal.

The magnet hole 13 includes a flux barrier 13b provided radially outward of the permanent magnet 12 inserted into the magnet hole 13. The magnet hole 13 further includes a flux barrier 13c provided radially inward of the permanent magnet 12 inserted into the magnet hole 13.

The magnet hole 14 includes a flux barrier 14b provided radially outward of the permanent magnet 12 inserted into the magnet hole 14. The magnet hole 14 further includes a flux barrier 14c provided radially inward of the permanent magnet 12 inserted into the magnet hole 14.

The magnet hole 16 is provided radially outward of the magnet hole 15. A plurality of (two in the present embodiment) permanent magnets 12 is inserted into the magnet hole 16.

The magnet hole 16 is provided so that the plurality of permanent magnets 12 inserted into the magnet hole 16 is arranged in a convex shape pointing radially outward. In other words, the plurality of permanent magnets 12 inserted into the magnet hole 16 is arranged in a V-shape pointing radially outward.

Like the magnet hole 15, the magnet hole 16 is thus provided so that the plurality of permanent magnets 12 inserted therein is arranged in a convex shape pointing radially outward. As a result, the magnetic path between the magnet hole 16 and the magnet hole 15 can be prevented from becoming narrower compared to the case where the plurality of permanent magnets 12 inserted into the magnet hole 16 is arranged in a convex shape pointing radially inward.

The magnet hole 16 includes a magnet hole 16a provided on the one side (E1 side) in the circumferential direction with respect to the d-axis and a magnet hole 16b provided on the other side (E2 side) in the circumferential direction with respect to the d-axis. One permanent magnet 12 is inserted into each of the magnet hole 16a and the magnet hole 16b.

A bridge portion 35 located on the d-axis is provided between the magnet hole 16a and the magnet hole 16b. The bridge portion 35 is provided so as to extend along the d-axis.

The magnet hole 16a includes a flux barrier portion 16c provided on one side (E1 side) in the circumferential direction of the permanent magnet 12 inserted into the magnet hole 16a. The magnet hole 16b includes a flux barrier portion 16d provided on the other side (E2 side) in the circumferential direction of the permanent magnet 12 inserted into the magnet hole 16b.

An outer magnet layer 52 is formed by the permanent magnets 12 inserted into each of the magnet hole 16a and the magnet hole 16b. That is, each of the plurality of magnetic poles 20 has a two-layer magnet structure composed of the inner magnet layer 51 and the outer magnet layer 52. With this structure, since magnetic flux flows between the inner magnet layer 51 and the outer magnet layer 52, the reluctance torque can be effectively used. As a result, the number of magnets can be reduced while improving the torque.

The permanent magnets 12 inserted into each of the magnet hole 16a and the magnet hole 16b have an N pole on their radially outer side and an S pole on their radially inner side. The permanent magnets 12 inserted into each of the magnet hole 13 and the magnet hole 14 have an N pole on their d-axis side and an S pole on their q-axis side. The permanent magnets 12 inserted into the magnet hole 15 have an N pole on their radially outer side and an S pole on their radially inner side. The above arrangement of the N pole and the S pole is reversed between the magnetic poles 20 adjacent to each other in the circumferential direction.

Each of the distance L1 (see FIG. 1) between the bridge portion 31 and the bridge portion 33 and the distance L2 (see FIG. 1) between the bridge portion 32 and the bridge portion 34 is smaller than the distance L3 (see FIG. 1) between the bridge portion 33 and the bridge portion 34. The distance L1 and the distance L2 are substantially equal.

Stress that is applied to each of the bridge portion 31 and the bridge portion 32 can thus be reduced compared to the case where each of the distance L1 between the bridge portion 31 and the bridge portion 33 and the distance L2 between the bridge portion 32 and the bridge portion 34 is larger than the distance L3 between the bridge portion 33 and the bridge portion 34.

Comparison of Stress with Comparative Example

Next, stress in the rotor core 10 (laminated core 11) of the present embodiment and stress in a rotor core (laminated core 111) of a comparative example (see FIG. 3) will be compared with reference to FIGS. 1 to 3.

The configuration of the laminated core 111 of the comparative example will be described. As shown in FIG. 3, the laminated core 111 is provided with a magnet hole 113 on the one side (E1 side) in the circumferential direction with respect to the d-axis, and is provided with a magnet hole 114 on the other side (E2 side) in the circumferential direction with respect to the d-axis. The magnet hole 113 and the magnet hole 114 form a U-shape pointing radially inward. A bridge portion 131 is provided between the magnet hole 113 and an outer edge 111b of the laminated core 111. A bridge portion 132 is provided between the magnet hole 114 and the outer edge 111b of the laminated core 111.

A center bridge 130 located on the d-axis is provided between the magnet hole 113 and the magnet hole 114. A magnet hole 116a and a magnet hole 116b are provided radially outward of the center bridge 130. Permanent magnets 12 inserted into the magnet hole 116a and the magnet hole 116b are arranged in a V-shape.

In this case, the simulation results were obtained that the stress applied to the bridge portion 31 and the bridge portion 32 during rotation of the rotor 1 of the present embodiment is smaller than the stress applied to the bridge portion 131 and the bridge portion 132 during rotation of the rotor (laminated core 111) of the comparative example. This is because the distance L1 (see FIG. 1) between the bridge portion 31 and the bridge portion 33 and the distance L2 (see FIG. 1) between the bridge portion 32 and the bridge portion 34 is smaller than the distance L11 (see FIG. 3) between the bridge portion 131 and the center bridge 130 and the distance L12 (see FIG. 3) between the bridge portion 132 and the center bridge 130.

The distance L4 (see FIG. 1) between an inner periphery 11e (see FIG. 1) of the laminated core 11 and the bridge portion 33 and the distance L5 (see FIG. 1) between the inner periphery 11e (see FIG. 1) and the bridge portion 34 is greater than the distance L13 (see FIG. 3) between an inner periphery 111e (see FIG. 3) of the laminated core 111 and the center bridge 130.

Therefore, the stress that is applied to the bridge portion 33 and the bridge portion 34 when fastening the shaft (not shown) in the shaft insertion hole 3 can be made smaller than the stress that is applied to the center bridge 130 when fastening a shaft in a shaft insertion hole 23 (see FIG. 3) of the laminated core 111. The stress that is applied to the bridge portion 33 and the bridge portion 34 when fastening the shaft can thus be made relatively small. Therefore, even if the rotor core 10 is reduced in size and the distance L4 and the distance L5 are reduced accordingly, the stress that is applied to the bridge portion 33 and the bridge portion 34 can be easily kept within the allowable range. Fastening of the shaft includes shrink fitting, fastening with a nut, etc.

Modifications

The embodiment disclosed herein should be construed as illustrative in all respects and not restrictive. The scope of the present disclosure is shown by the claims rather than by the above description of the embodiment, and includes all changes (modifications) that fall within the meaning and scope equivalent to the claims.

For example, the above embodiment illustrates an example in which each of the magnet hole 13 (one side magnet hole) and the magnet hole 14 (other side magnet hole) extends in the radial direction so that the plurality of permanent magnets 12 is arranged in a W-shape. However, the present disclosure is not limited to this. For example, each of the magnet hole 13 and the magnet hole 14 may be tilted at a predetermined angle (e.g., 45 degrees) with respect to the radial direction, and the permanent magnets 12 may not be arranged in a W-shape.

The above embodiment illustrates an example in which the magnet hole 15 (intermediate magnet hole) is formed by a single hole. However, the present disclosure is not limited to this. The magnet hole 15 may be formed by a plurality of holes. In this case, a bridge portion is provided between the holes.

The above embodiment illustrates an example in which four permanent magnets 12 are arranged in the inner magnet layer 51. However, the present disclosure is not limited to this. For example, eight permanent magnets 12 may be arranged in the inner magnet layer 51. In this case, for example, two permanent magnets 12, four permanent magnets 12, and two permanent magnets 12 are arranged in the magnet hole 13, the magnet hole 15, and the magnet hole 14, respectively.

The above embodiment illustrates an example in which each of the bridge portion 33 and the bridge portion 34 is tilted toward the d-axis such that the radial outer sides of the bridge portion 33 and the bridge portion 34 are located closer to the d-axis. However, the present disclosure is not limited to this. Each of the bridge portion 33 and the bridge portion 34 may be provided so as to extend in a direction other than the direction in which the radial outer sides of the bridge portion 33 and the bridge portion 34 are located closer to the d-axis (e.g., a direction along the d-axis).

The above embodiment illustrates an example in which the laminated core 11 is provided with the magnet hole 16 (outer magnet hole) (outer magnet layer 52). However, the present disclosure is not limited to this. The laminated core 11 may not be provided with the magnet hole 16 (outer magnet layer 52).

The above embodiment illustrates an example of the two-layer magnet structure composed of the outer magnet layer 52 and the inner magnet layer 51. However, the present disclosure is not limited to this. Three or more magnet layers may be provided.

The above embodiment illustrates an example in which the magnet hole 16 is provided so that the plurality of permanent magnets 12 inserted into the magnet hole 16 (outer magnet hole) is arranged in a convex shape pointing radially outward. However, the present disclosure is not limited to this. For example, the magnet hole 16 may be provided so that the plurality of permanent magnets 12 inserted into the magnet hole 16 is arranged in a convex shape pointing radially inward or is perpendicular to the radial direction.

The above embodiment illustrates an example in which each of the distance L1 between the bridge portion 31 (first outer bridge portion) and the bridge portion 33 (first inner bridge portion) and the distance L2 between the bridge portion 32 (second outer bridge portion) and the bridge portion 34 (second inner bridge portion) is smaller than the distance L3 between the bridge portion 33 and the bridge portion 34. However, the present disclosure is not limited to this. Each of the distance L1 and the distance L2 may be equal to or greater than the distance L3.

DESCRIPTION OF THE REFERENCE NUMERALS

10 . . . rotor core, 11 . . . laminated core, 11a . . . electrical steel plate, 11b . . . outer edge, 11c . . . radially inner portion, 11d . . . radially outer portion, 12 . . . permanent magnet, 13 . . . magnet hole (one side magnet hole), 13a . . . end (end of one side magnet hole), 14 . . . magnet hole (other side magnet hole), 14a . . . end (end of other side magnet hole), 15 . . . magnet hole (intermediate magnet hole), 15a . . . flux barrier (magnetic gap), 16 . . . magnet hole (outer magnet hole), 20 . . . magnetic pole, 31 . . . bridge portion (first outer bridge portion), 32 . . . bridge portion (second outer bridge portion), 33 . . . bridge portion (first inner bridge portion), 34 . . . bridge portion (second inner bridge portion)

The invention claimed is:

1. A rotor core, comprising:
an annular laminated core formed by stacking a plurality of electrical steel sheets; and
a plurality of permanent magnets forming a plurality of magnetic poles arranged circumferentially, wherein
the laminated core includes, in each of the plurality of magnetic poles, a one side magnet hole that is provided on one side in a circumferential direction with respect to a d-axis and into which the permanent magnet is inserted, an other side magnet hole that is provided on the other side in the circumferential direction with respect to the d-axis and into which the permanent magnet is inserted, an intermediate magnet hole that is formed by a single hole and that is provided between the one side magnet hole and the other side magnet hole and into which at least two permanent magnets of the plurality of the permanent magnets is inserted so as to be arranged in a convex shape pointing radially outward, a first outer bridge portion provided between a radially outer end of the one side magnet hole and an outer edge of the laminated core, a second outer bridge portion provided between a radially outer end of the other side magnet hole and the outer edge, a first inner bridge portion provided between the one side magnet hole and the intermediate magnet hole and connecting a radially inner portion of the laminated core and a radially outer portion of the laminated core, and a second inner bridge portion provided between the other side magnet hole and the intermediate magnet hole and connecting the radially inner portion and the radially outer portion.

2. The rotor core according to claim 1, wherein the laminated core includes an outer magnet hole that is provided radially outward from the intermediate magnet hole and into which a plurality of the permanent magnets is inserted so as to be arranged in a convex shape pointing radially outward.

3. The rotor core according to claim 1, wherein an angle formed by a direction in which the one side magnet hole extends and the d-axis, and an angle formed by a direction in which the other side magnet hole extends and the d-axis is smaller than ½ of a bending angle of the intermediate magnet hole.

4. The rotor core according to claim 1, wherein each of the first inner bridge portion and the second inner bridge portion is tilted toward the d-axis in such a manner that radial outer sides of the first inner bridge portion and the second inner bridge portion are located closer to the d-axis as viewed in an axial direction of the laminated core.

5. The rotor core according to claim 4, wherein the laminated core includes an outer magnet hole that is provided radially outward from the intermediate magnet hole and into which a plurality of the permanent magnets is inserted so as to be arranged in a convex shape pointing radially outward.

6. The rotor core according to claim 1, wherein
each of the one side magnet hole and the other side magnet hole is provided so as to extend in a radial direction, and
the laminated core is configured in such a manner that the permanent magnet inserted into the one side magnet hole, the permanent magnet inserted into the other side magnet hole, and the plurality of permanent magnets inserted into the intermediate magnet hole are arranged in a W-shape.

7. The rotor core according to claim 6, wherein the laminated core includes an outer magnet hole that is provided radially outward from the intermediate magnet hole and into which a plurality of the permanent magnets is inserted so as to be arranged in a convex shape pointing radially outward.

8. The rotor core according to claim 6, wherein each of the first inner bridge portion and the second inner bridge portion is tilted toward the d-axis in such a manner that radial outer sides of the first inner bridge portion and the second inner bridge portion are located closer to the d-axis as viewed in an axial direction of the laminated core.

9. The rotor core according to claim 8, wherein the laminated core includes an outer magnet hole that is provided radially outward from the intermediate magnet hole and into which a plurality of the permanent magnets is inserted so as to be arranged in a convex shape pointing radially outward.

10. The rotor core according to claim 6, wherein
the intermediate magnet hole is formed by the single hole that is bent into a convex shape pointing radially outward and into which the plurality of permanent magnets is inserted, and
a magnetic gap is formed between the permanent magnets inserted into the intermediate magnet hole.

11. The rotor core according to claim 10, wherein the laminated core includes an outer magnet hole that is provided radially outward from the intermediate magnet hole and into which a plurality of the permanent magnets is inserted so as to be arranged in a convex shape pointing radially outward.

12. The rotor core according to claim 10, wherein each of the first inner bridge portion and the second inner bridge portion is tilted toward the d-axis in such a manner that radial outer sides of the first inner bridge portion and the second inner bridge portion are located closer to the d-axis as viewed in an axial direction of the laminated core.

13. The rotor core according to claim 12, wherein the laminated core includes an outer magnet hole that is provided radially outward from the intermediate magnet hole and into which a plurality of the permanent magnets is inserted so as to be arranged in a convex shape pointing radially outward.

* * * * *